United States Patent Office 3,228,003
Patented Jan. 4, 1966

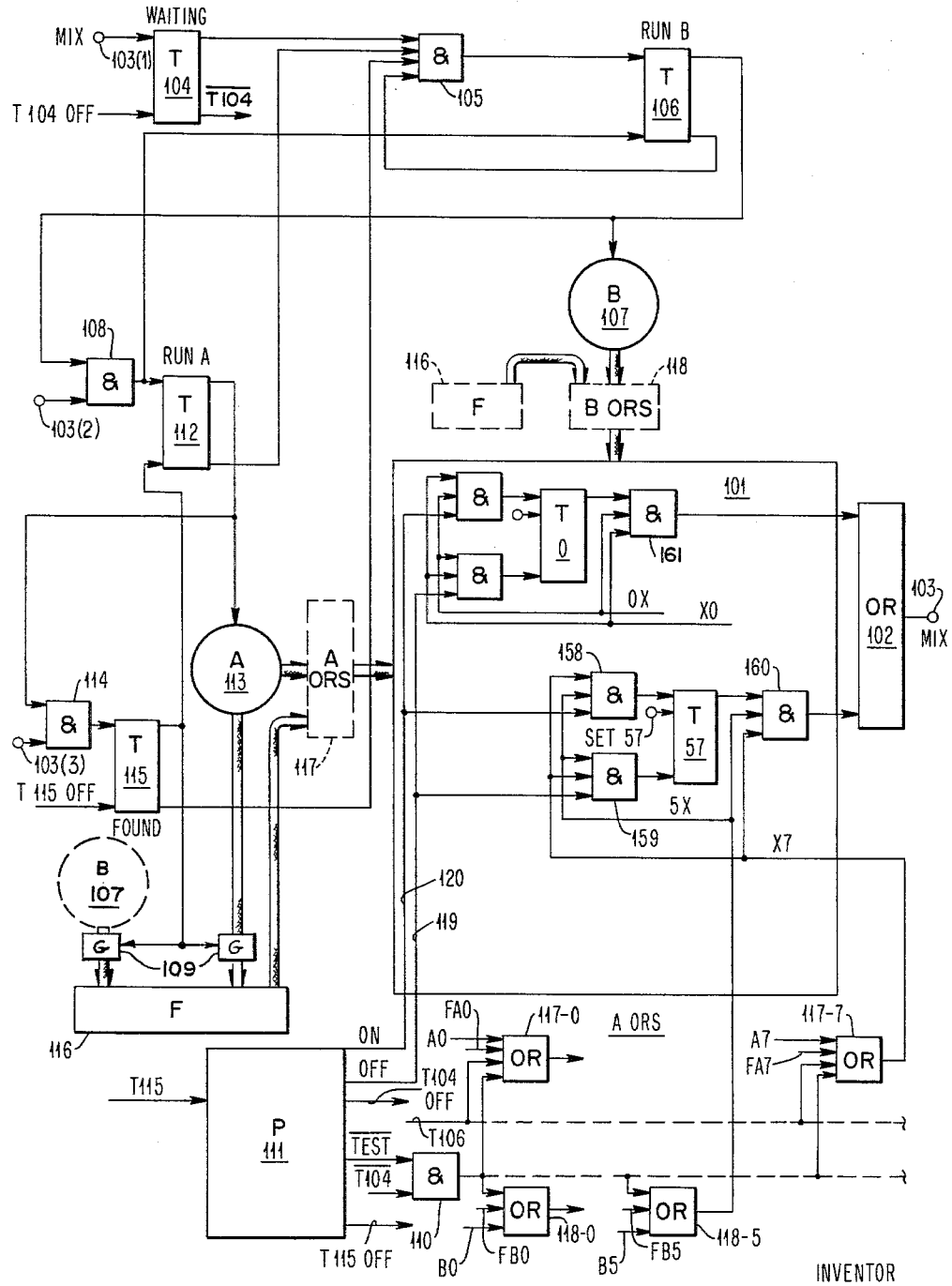

3,228,003
MATRIX SEARCH DEVICE
Arthur J. Scriver, Jr., Wappingers Falls, N.Y., assignor to International Business Machines Corporation, New York, N.Y., a corporation of New York
Filed Mar. 20, 1962, Ser. No. 180,988
7 Claims. (Cl. 340—166)

This invention relates to electronic switching and more particularly to mechanisms for determining which trigger of a matrix of independently settable triggers has been set.

In electronic data processing, it is common to provide for computer interrupt by means of a priority mechanism. The priority mechanism commonly includes a group of alert triggers, each assigned to a particular mechanism which can cause an interrupt, an interrupt, which triggers are scannable in sequence to determine which has been set. The position of the particular trigger in the scanning sequence determines the priority of the related alerting device. In systems which include only a limited number of alerting devices, it is entirely feasible to scan each of the alerting triggers at a particular time in sequence to determine if any has been set and thus to locate the set trigger of higher priority. Where the number of triggers is very great, however, the time consumed in scanning the triggers sequentially can become a major cost factor when it is considered that the entire computer operation may be tied up awaiting the results of the scan.

The desire for speed in determining whether an alert trigger has been set, and if so, which of the several alert triggers has been set, has been known for some time.

DEFINITIONS

*Alert trigger.*—A trigger which may be set in response to an external stimulus.

*Alerting device.*—An external device such as a tape unit which requests service by providing stimulus to set its respectively related alert trigger.

*Alerting trigger.*—The highest priority alert trigger which has been set.

*Alerting group.*—The group of alert triggers containing the alerting trigger.

OBJECT

It is the object of this invention to provide mechanism at reasonable cost to accomplish very fast determination that one of the array of alert triggers has been set and to identify the alerting trigger.

FEATURE

The array of alert triggers is arranged electronically in matrix fashion; that is, a number of rows and a number of columns. For example, a hundred triggers are arranged in a 10 x 10 matrix. Two "rings" are employed for locating the alerting trigger. A B ring is designated as the column (group) ring and an A ring as the row (unit) ring. The B ring narrows the search down to a single alerting group and signals the A ring to begin operation. The A ring scans the alert triggers within the alerting group and stops when the alerting trigger has been found. The settings of the B and A rings then identify the alerting trigger by forming its numeric designation (matrix address).

ADVANTAGES

The entire matrix of alert triggers has need for only one OR block as the basic output. Each alert trigger is connected to the output OR block which initially signals that an unknown one of the alert triggers is set. Then, during scanning of the alert trigger column groups by the B ring, the OR block signals that the alerting group has been found. Finally, during scanning by the A ring of the alert triggers within the alerting group, the OR block signals that the alerting trigger has been found. The settings of the B and A rings hold the address at this time of the alerting trigger which address can be used by other mechanisms to determine which of the possible alerts did actually occur.

Advantages thus are simplicity of alert trigger outputs, simplicity of mechanism to perform the search, and the ease with which the found alerting trigger is identified. Speed and economy are thus combined.

The foregoing and other objects, features and advantages of the invention will be apparent from the following more particular description of a preferred embodiment as illustrated in the accompanying drawing.

DRAWING

The figure shows the alert trigger matrix in demonstrative form and the search mechanism in schematic form.

SUMMARY

The invention relates to mechanism for determining that one of an array of alert triggers has been set (alerting trigger) and for locating the alerting trigger.

One hundred alert triggers 0–99 (such as alert trigger 57) form alert trigger matrix 101. The alert triggers are arranged in ten columns and ten rows so that each of the ten column groups contains ten alert triggers. At an initial time, one of the alert triggers (such as trigger 57) is set directly by an external alerting device. The alerting trigger thus turned on conditions related AND block 160 to provide a signal MIX from output OR block 102. The signal MIX sets Waiting trigger 104, which prevents subsequent alerts from conditioning output AND's such as AND blocks 160 and 161 by deconditioning AND block 110, thus deconditioning A OR's 117 and B OR's 118.

The initial signal MIX completes conditioning of AND block 105 which sets Run B trigger 106 and starts B ring 107. B ring 107 scans the alert triggers in column groups of ten as it progresses 0, 1, 2, 3, 4, 5, 6, 7, 8, 9. When the alerting group is scanned, OR block 102 provides a second signal MIX. This completes conditioning of AND block 108 and thus turns off Run B trigger 106, freezing B ring 107 on the alerting group. AND block 108 also sets Run A trigger 112 which causes A ring 113 to scan individual alert triggers within the alerting group 0, 1, 2, 3, 4, 5, 6, 7, 8, 9. Upon scanning of the alerting trigger, output OR circuit 102 provides a third signal MIX. The third MIX, with signal Run A, conditions AND block 114 to set Found trigger 115. Found trigger 115 controls gating, through gates 109, of A ring 113 and B ring 107 contents (alterting trigger address) to Field register 116.

Preferred embodiment.—Figure 1

Matrix 101 contains a hundred alert triggers (0–99 with trigger 0 and trigger 57 shown) arranged in ten columns and ten rows. The alert triggers are each set from an external alerting device when the alerting device requires service. The usual function of the alert triggers is to provide a computer with the knowledge that a peripheral unit such as a tape unit desires access to the main computer memory to fetch or to store a group of data. The particular function which each alert trigger performs is merely to store the fact that it has been turned on and provide information indicative of this fact to a utilization device, which interprets the fact.

MIX

Each of the hundred alert triggers connects through output OR block 102 to MIX line 103 which connects to a utilization device and feeds back to various parts of the search mechanism. The initial signal MIX indicates unidentified one of the matrix of alert triggers has been set to the alerting condition.

Output OR block 102, by providing signal MIX, sets Waiting trigger 104.

RUN B RING

Waiting trigger 104 provides one input to AND block 105 which, in most situations, is all that is necessary to set Run B trigger 106. Run B trigger 106 provides operation stimulus continually to B ring 107 and conditions the top input of AND block 108. B ring 107 steps through the columns of alert triggers in groups of ten by conditioning the first column, then the second, then the third and so on 0, 1, 2, 3, 4, 5, 6, 7, 8, 9.

ROW SELECT

Run B trigger 106 conditions all the row select A OR's. This allows B ring 107 to scan ten triggers at a time; how this is done is apparent at lower right in FIGURE 1. Row select A OR block 117-7 (row 7) is conditioned by, among other things, signal T106 taken from Run B trigger 106. A similar signal T106 connects to each of nine other Row Select OR blocks. This selects each row of alert triggers, to which the OR blocks connect in standard double-select matrix fashion, and thus allows each Column Select OR block 118-0 to 118-9 to interrogate a group of ten alert triggers as it is conditioned by the B ring.

COLUMN SELECT

Column select B OR block 118-5 provides a function similar to that of row select A OR block 117-7, but for column 5 as selected by B ring 107. Nine other column select B OR blocks are provided, one for each of the other nine columns. The B ring output B5 is connected to OR block 118-5 which thus provides signal 5X. By a combination of signal 5X and the signal X7, alert trigger 57 is selected in normal double-select matrix fashion.

INITIAL MIX

This discussion is ahead of itself. The initial state of the matrix of alert triggers is "no alert trigger on," no signal MIX output of OR block 102 exists and Waiting trigger 104 is off. Signal $\overline{T104}$ at AND block 110 combines with signal $\overline{TEST}$ which is made available during normal alerting operations by Program unit 111. This conditions both OR blocks 117-7 and 118-5 and all of the other eighteen row select A OR blocks and column select B OR blocks, and thus conditions all of the output AND's. Each of the output AND's is conditionable by the output of its related trigger and appropriate column and row signals from the related A OR block 117-X and B OR block 118-X. Any one of the alert triggers may be set by an initial stimulus from an alerting device, which sets the alert trigger directly. Each alert trigger has a terminal for this purpose. When an alert trigger is set, the desired function is to develop signal MIX at terminal 103 to indicate the fact that the alerting trigger has been set. The initial stimulus which sets the alerting trigger may be transitory; the alerting trigger takes over.

SELECTION OF ALERTING GROUP

Once the alerting trigger has been set, output OR block 102 provides signal MIX which sets Waiting trigger 104 and sets Run B trigger 106 to initiate operation of B ring 107. Run B trigger 106 conditions all A OR's 117-0 to 117-9. B ring 107 scans the columns of alert triggers in column groups thus of ten by conditioning B OR's 118-0, 118-1 . . . 118-5 . . . while all ten A OR's 117-0 to 117-9 are conditioned. There is no output from output OR block 102 unless the column group of ten triggers being interrogated is the alerting group. Demonstrative alert trigger 57 thus provides an output via AND 160 and OR 102 on the sixth step (0—5,6) of the B ring if it is the alerting trigger. When the alerting group (column 5) is thus scanned by B OR 118-5 under control of B ring 107, a second signal MIX occurs at output OR block 102. This second signal MIX conditions AND block 108 to turn off Run B trigger 106. The B ring stops on 5 and thus freezes in an attitude addressing the alerting group, column group 5; B ring signal B5 maintains B OR 118-5 operative with column select signal 5X.

SELECTION OF ALERTING TRIGGER

AND block 108 also sets Run A trigger 112. This turns off lower output of trigger 112, preventing of further setting of Run B trigger 106, and conditions A ring 113 to scan the alert triggers within the alerting group to find which is the alerting trigger. Run A trigger 112 also conditions the top input to AND block 114. A ring 113 attempts to step through the rows 0, 1, 2, 3, 4, 5, 6, 7, 8, 9 in order, by conditioning A OR's 117-0, 117-1 . . . 117-7 . . . 117-9. The alerting trigger is within column group 5, and B ring 107 is frozen addressing the alerting group 5X via B OR 118-5. When the alerting trigger (57 in example) output AND 160 is interrogated by signal X7 from A OR 117-5 (signal 5X remains), OR block 102 provides a third signal MIX.

The third signal MIX conditions AND block 114 to set Found trigger 115. The output of Found trigger 115 is the signal that the search is completed and that the address of the alerting trigger (57 in the example) is currently in A ring 113 and B ring 107. Found trigger 115 turns off Run A trigger 112 to stop A ring 113 and controls gating of B ring 107 and A ring 113 contents to Field register 116. Program unit 111 can at this time gate the content of Field register 116 to a utilization device such as a computer. Field register 116 content is precisely the number (matrix address 57) of the alerting trigger.

Alerting trigger 57 can be turned off by program unit 111 simply by conditioning off line 119. Both B ring 107 and A ring 113 are stopped, providing signal A7 to A OR 117-7 and signal B5 to B OR 118-5. This conditions AND block 159 associated with trigger 57 turn off. Alerting trigger 57 can also be referenced by Field register 116 signals FB5 to B OR 118-5 and FA7 to A OR 117-7, together with signal ON at line 120 or signal OFF at line 119 to condition AND block 158 for turn on or AND block 159 for turn off.

COMPONENTS

Alert triggers 0-99 (57 shown) and control triggers 104, 106, 112, 115 are bistable devices of any common type which are set by a set signal and reset by a reset signal, and emit continuous yes or no outputs according to their set or reset condition. Such triggers are well known. One example is disclosed in U.S. Patent 2, 947,882, August 2, 1960, Chow, Transistor Trigger Circuits, IBM.

RINGS

Rings 107 and 113 emit signals 0, 1, 2, 3, 4, 5, 6, 7, 8, 9 in time sequence when conditioned for operation. A preferred ring is a "folded ring" of the type described by James G. Brenza at page 81 of the IBM Technical Disclosure Bulletin, V2 No. 3, October 1959.

AND and OR circuits are logical circuits which respond to inputs in AND or OR fashion to provide outputs. Such circuits are described in such texts as Richards, Arithmetic Operations in Digital Computers (see page 32).

While the invention has been particularly shown and described with reference to a preferred embodiment, it will be understood by those skilled in the art that various changes in form and details may be made without departing from the spirit and scope of the invention.

What is claimed is:

1. A search device for searching a plurality of trigger means arranged in rows and columns, each of said trigger means having the capability of being independently placed in a set condition by an external signal, with an unspecified one of said trigger means being in a set condition, comprising:

gate means for receiving signals from each of said trigger means;

initiating signal means to simultaneously connect all of said trigger means to said gate means whereby said unspecified trigger means conditions said gate means to provide a first signal that an unidentified one of said trigger means has been set;

column scanning means responsive to said first signal to cause said scanning means to scan the columns of said trigger means to locate the column containing said unspecified one of said trigger means and to condition said gate means to provide a second signal;

row scanning means responsive to said second signal from said gate means to scan in sequence the rows of said trigger means to locate said unspecified one of said trigger means and to condition said gate means to provide a third signal.

2. A search device according to claim 1, wherein said column scanning means and said row scanning means are each capable of retaining an address signal representative of the column in which said unspecified trigger means is located and the location of said unidentified trigger within said column, respectively;

additional trigger means connected to said gate means responsive to said third signal of said gate means to enter said address signals from said column searching means and said row scanning means to a receiving register to store and identify said unspecified trigger means by its matrix address at the register.

3. A search device for searching an array of trigger means arranged in columns and rows, each of said trigger means having the capability of being independently placed in a set condition by an external signal, with an unspecified one of said trigger means being set, comprising:

gate means for receiving signals from each of said trigger means;

initiating signal means to simultaneously connect all of said trigger means to said gate means to produce a first output signal indicative of the setting of an unidentified one of said trigger means;

column searching means responsive to said first output signal from said gate means to sequentially connect the columns of said trigger means to said gate means until the column containing said unspecified trigger means produces an output to identify said column and to cause said gate means to produce a second output signal; row scanning means responsive to said second output signal from said gate means to sequentially connect individual trigger means within said identified column to said gate means until said unspecified set trigger produces an identifying output signal to cause said gate means to produce a third output signal.

4. A search device for searching a plurality of trigger means arranged in rows and columns, each of said triggers capable of being placed in set condition by an external signal;

gate means for receiving signals from each of said trigger means, said gate means providing an initial signal that an unidentified one of said trigger means has been set;

means for connecting said trigger means to said receiving means;

first trigger means for receiving said initial signal and producing an output signal;

column scanning means for receiving the output of said first trigger means to cause said column scanning means to scan the column of trigger means to locate the column containing said unidentified one of said trigger means;

means responsive to the locating of the column containing said unidentified one of said trigger means to cause said gate means to produce a second signal;

row scanning means responsive to said second signal for stopping the scanning operation of said column scanning means and for initiating the scanning operation of said row scanning means to locate said unidentified one of said trigger means within the prior located column;

means responsive to a locating of the set trigger means within said located column to cause said gate means to produce a third output signal.

5. A search device for searching a matrix of independently settable trigger means arranged in a plurality of columns and a plurality of rows, comprising:

gate means for receiving signals from each of said settable trigger means;

a plurality of selective gating means to interconnect said settable trigger means to said gate means;

signal initiating means to simultaneously produce column select and row select signals to initiate an output response from said selective gating means to connect all of said settable triggers to said gate means;

a first scanning means to produce all said row select signals and to sequentially produce said column select signals to connect settable triggers, in respective column groups, to said gate means;

a second scanning means to produce sequential row select signals to connect individual settable triggers to said gate means during a period when said first scanning means is standing on a selected column;

control means connected to said signal initiating means to operate, in sequence, said signal initiating means, said first scanning means, and said second scanning means in response to a series of outputs from said gate means.

6. A search device according to claim 5 including register means for storing and utilizing column select signals from said first scanning means and row select signals from said second scanning means to indicate the address of said individual settable trigger means within said matrix;

additional trigger means to transfer said column select signals and said row select signals to said register means from said first and said second scanning means, respectively.

7. A search device for searching a plurality of trigger means arranged in rows and columns, each of said trigger means capable of being independently placed in a set condition by an external signal, comprising:

gate means for receiving signals from each of said trigger means, said gate means providing a first signal to indicate that an unidentified one of said trigger means has been set;

signal initiating means for connecting all said trigger means to said gate means;

first trigger means for receiving said first signal from said gate means to produce an output signal;

second trigger means responsive to said first trigger means;

column select means connected to each of said trigger means to provide sequential column select signals for each of the columns of said trigger means;

row select means connected to each of said trigger means to provide sequential row select signals for each of the rows of said trigger means;

first initiation means responsive to said second trigger means to activate said column select and said row select means to sequentially connect individual columns of said trigger means to said gate means to provide a second signal from said gate means when a selected column containing a set trigger of said settable trigger means is connected to said gate means, said first initiating means having the capability of storing the address of the selected column;

third trigger means connected to said gate means and to said second trigger means, said third trigger jointly responsive to said second trigger and said second signal from said gate means to produce a column select stop signal;

connecting means to connect said third trigger means to said second trigger means responsive to said stop signal to turn off said second trigger means to stop said column select means at the address of the column containing the set trigger;

second initiating means, connected to said third trigger and to said row select means, responsive to said stop signal to activate said row select means to sequentially connect said individual trigger means, within the column to which said column select and row select means is addressed, to said gate means, said gate means providing a third signal output when said individual set trigger is connected to said gate means;

register means for storing said identifying signals from said column scanning and said row scanning means;

fourth trigger means responsive to said third output signal from said gate means to transfer the stored address of the selected column and selected row from said column select means and said row select means, respectively, to said register.

References Cited by the Examiner
UNITED STATES PATENTS

| | | | |
|---|---|---|---|
| 1,799,485 | 4/1931 | Stehlik | 179—18.6 |
| 2,285,524 | 6/1942 | Logan | 179—18.6 |
| 2,502,415 | 4/1950 | Bray et al. | 179—18.6 |
| 2,662,119 | 12/1953 | Buchner | 179—18.6 |
| 2,854,517 | 9/1958 | Heetman | 179—18.6 |
| 2,919,309 | 12/1959 | Bataille et al. | 179—18.6 |
| 3,073,907 | 1/1963 | Alterman et al. | 179—18.6 |

NEIL C. READ, *Primary Examiner.*